United States Patent
Cedergren et al.

(10) Patent No.: US 10,334,489 B2
(45) Date of Patent: Jun. 25, 2019

(54) MOBILITY SYNCHRONIZATION MEASUREMENTS

(71) Applicant: Telefonaktiebolaget LM Ericsson (publ), Stockholm (SE)

(72) Inventors: Andreas Cedergren, Bjarred (SE); Andres Reial, Malmo (SE); Claes Tidestav, Balsta (SE)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 0 days.

(21) Appl. No.: 15/517,446

(22) PCT Filed: Oct. 8, 2014

(86) PCT No.: PCT/EP2014/071537
§ 371 (c)(1),
(2) Date: Apr. 6, 2017

(87) PCT Pub. No.: WO2016/055102
PCT Pub. Date: Apr. 14, 2016

(65) Prior Publication Data
US 2017/0303173 A1    Oct. 19, 2017

(51) Int. Cl.
*H04W 36/00* (2009.01)
*H04W 16/28* (2009.01)

(52) U.S. Cl.
CPC ........ *H04W 36/0083* (2013.01); *H04W 16/28* (2013.01)

(58) Field of Classification Search
CPC .......................... H04W 16/28; H04W 36/0083
See application file for complete search history.

(56) References Cited

U.S. PATENT DOCUMENTS

| 2001/0016504 A1* | 8/2001 | Dam | H04W 16/28 |
| | | | 455/562.1 |
| 2004/0213187 A1* | 10/2004 | Fujii | H04B 7/0408 |
| | | | 370/335 |

(Continued)

FOREIGN PATENT DOCUMENTS

| EP | 1722588 A1 | 11/2006 |
| KR | 20130028397 A | 3/2013 |

(Continued)

OTHER PUBLICATIONS

InnovationQ query search in NPL, Jan. 2019 (Year: 2019).*

(Continued)

*Primary Examiner* — Benjamin H Elliott, IV
(74) *Attorney, Agent, or Firm* — Leffler Intellectual Property Law, PLLC

(57) ABSTRACT

There is provided a method for handling mobility synchronization measurements. The method is performed by a wireless device. The method comprises receiving an indication to perform mobility measurements on a set of transmission beams associated with a unique identity. The method comprises checking if the unique identity has previously been stored by the wireless device. The method comprises, if the unique identity has not previously been stored by the wireless device, performing mobility measurements on the set of transmission beams to determine synchronization information of the set of transmission beams. The method comprises storing the unique identity and the synchronization information of the mobility measurements.

23 Claims, 4 Drawing Sheets

(56) References Cited

U.S. PATENT DOCUMENTS

| | | | |
|---|---|---|---|
| 2004/0214606 A1 | 10/2004 | Wichman et al. | |
| 2005/0272426 A1 | 12/2005 | Yang et al. | |
| 2007/0110015 A1* | 5/2007 | Chakraborty | H04B 7/022 370/338 |
| 2007/0249402 A1 | 10/2007 | Dong et al. | |
| 2008/0096566 A1* | 4/2008 | Brunner | C07D 491/04 455/437 |
| 2008/0181180 A1 | 7/2008 | Karaoguz | |
| 2010/0159845 A1* | 6/2010 | Kaaja | H04B 7/088 455/70 |
| 2010/0208633 A1* | 8/2010 | Takano | H04B 7/0617 370/310 |
| 2010/0272065 A1* | 10/2010 | Lee | H04W 36/02 370/331 |
| 2011/0201343 A1* | 8/2011 | Pinheiro | H04W 76/046 455/450 |
| 2011/0280223 A1* | 11/2011 | Maeda | H04W 4/08 370/335 |
| 2011/0305263 A1* | 12/2011 | Jöngren | H04B 7/0617 375/219 |
| 2012/0045996 A1* | 2/2012 | Uno | H04B 7/0408 455/63.1 |
| 2012/0258754 A1* | 10/2012 | Banu | H04W 8/186 455/513 |
| 2013/0041959 A1* | 2/2013 | Bengtsson | H04L 51/14 709/206 |
| 2013/0051364 A1* | 2/2013 | Seol | H04W 16/28 370/331 |
| 2013/0064239 A1 | 3/2013 | Yu et al. | |
| 2013/0121185 A1 | 5/2013 | Li et al. | |
| 2013/0182683 A1* | 7/2013 | Seol | H04W 72/04 370/335 |
| 2013/0201938 A1 | 8/2013 | Seol et al. | |
| 2013/0203415 A1* | 8/2013 | Arvidsson | H04W 60/00 455/435.1 |
| 2013/0258958 A1 | 10/2013 | Dinan | |
| 2013/0272263 A1 | 10/2013 | Pi et al. | |
| 2014/0010178 A1* | 1/2014 | Yu | H04W 74/0833 370/329 |
| 2014/0073337 A1* | 3/2014 | Hong | H04W 16/28 455/452.1 |
| 2014/0148173 A1* | 5/2014 | Karaoguz | H04B 7/0408 455/440 |
| 2014/0302869 A1* | 10/2014 | Rosenbaum | H04W 4/026 455/456.1 |
| 2015/0004972 A1* | 1/2015 | Nielsen | H04W 48/16 455/434 |
| 2015/0230263 A1* | 8/2015 | Roy | H04W 36/0083 455/452.2 |
| 2016/0043781 A1* | 2/2016 | Cho | H04L 5/0051 342/373 |
| 2016/0087706 A1* | 3/2016 | Guey | H04L 27/2607 375/267 |
| 2016/0337994 A1* | 11/2016 | Han | H04W 56/00 |
| 2016/0360463 A1* | 12/2016 | Kim | H04B 7/0617 |
| 2017/0303173 A1* | 10/2017 | Cedergren | H04W 36/0083 |

FOREIGN PATENT DOCUMENTS

| | | |
|---|---|---|
| KR | 20140113642 A | 9/2014 |
| RU | 2406263 C2 | 12/2010 |
| WO | 2005050899 A2 | 6/2005 |
| WO | 2010052519 A1 | 5/2010 |
| WO | 2013036021 A2 | 3/2013 |
| WO | 2014099168 A1 | 6/2014 |

OTHER PUBLICATIONS

InnovationQ query search in US PGPub, Jan. 2019 (Year: 2019).*
Russian Office Action dated Apr. 13, 2018 in connection with Russian Application No. 2017115641, 6 pages.
English language translation of Russian Office Action dated Apr. 13, 2018 in connection with Russian Application No. 2017115641, 4 pages.
Russian Search Report dated Apr. 13, 2018 in connection with Russian Application No. 2017115641, 2 pages.
PCT International Search Report, dated Jun. 17, 2015, in connection with International Application No. PCT/EP2014/071537, all pages.
PCT Written Opinion, dated Jun. 17, 2015, in connection with International Application No. PCT/EP2014/071537, all pages.
Japanese Office Action, dated Jul. 17, 2018, in connection with Japanese Application No. 2017-518985, 4 pages.
English language summary of Japanese Office Action, dated Jul. 17, 2018, in connection with Japanese Application No. 2017-518985, 2 pages.
Korean Office Action, dated Jul. 2, 2018, in connection with Korean Application No. 2017-7011415, 4 pages.
English language summary of Korean Office Action, dated Jul. 2, 2018, in connection with Korean Application No. 2017-7011415, 2 pages.

* cited by examiner

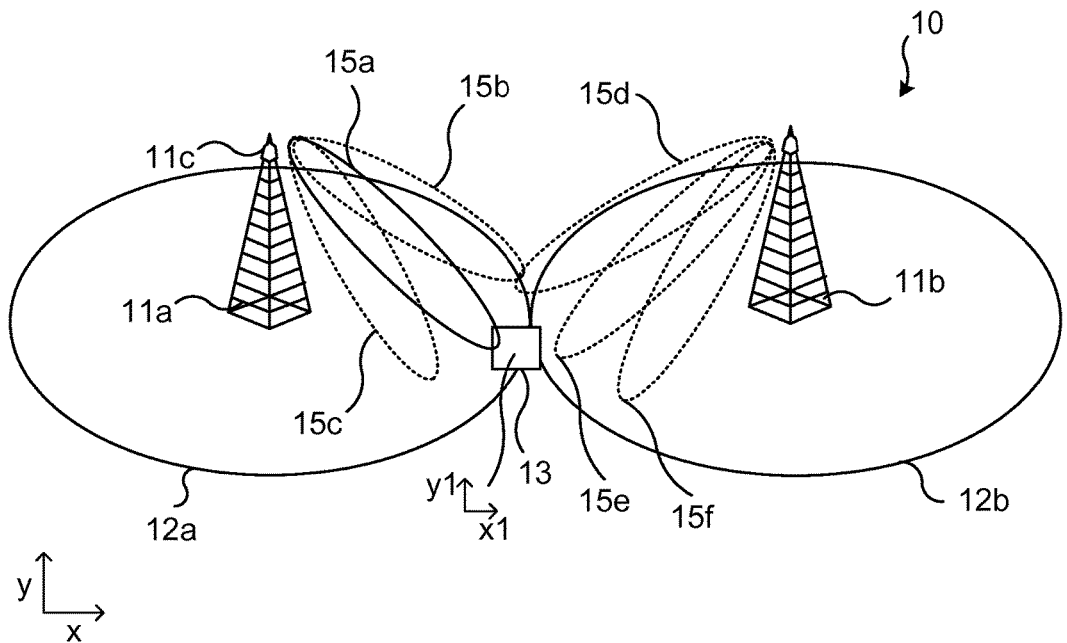
Fig. 1
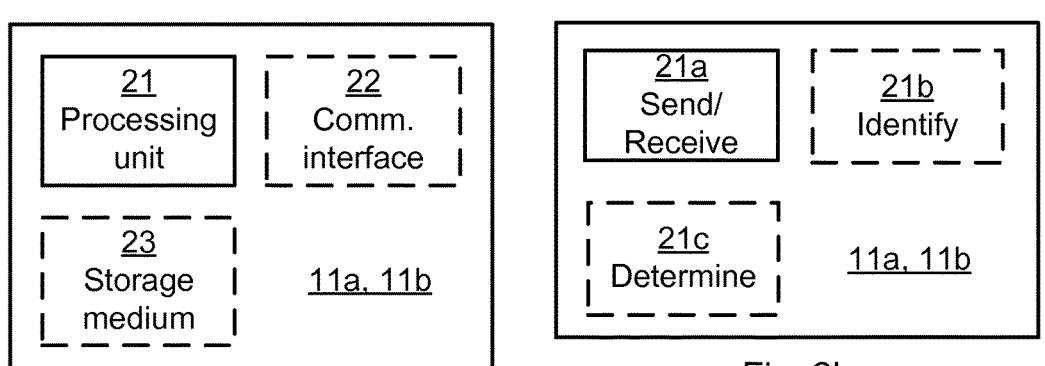
Fig. 2a
Fig. 2b
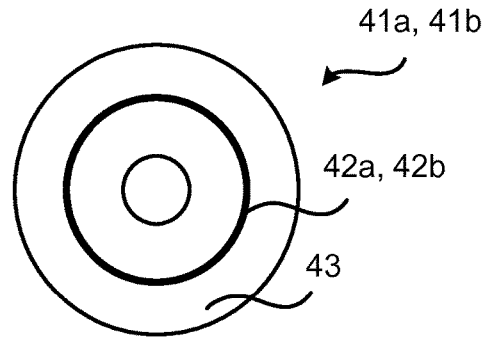
Fig. 4

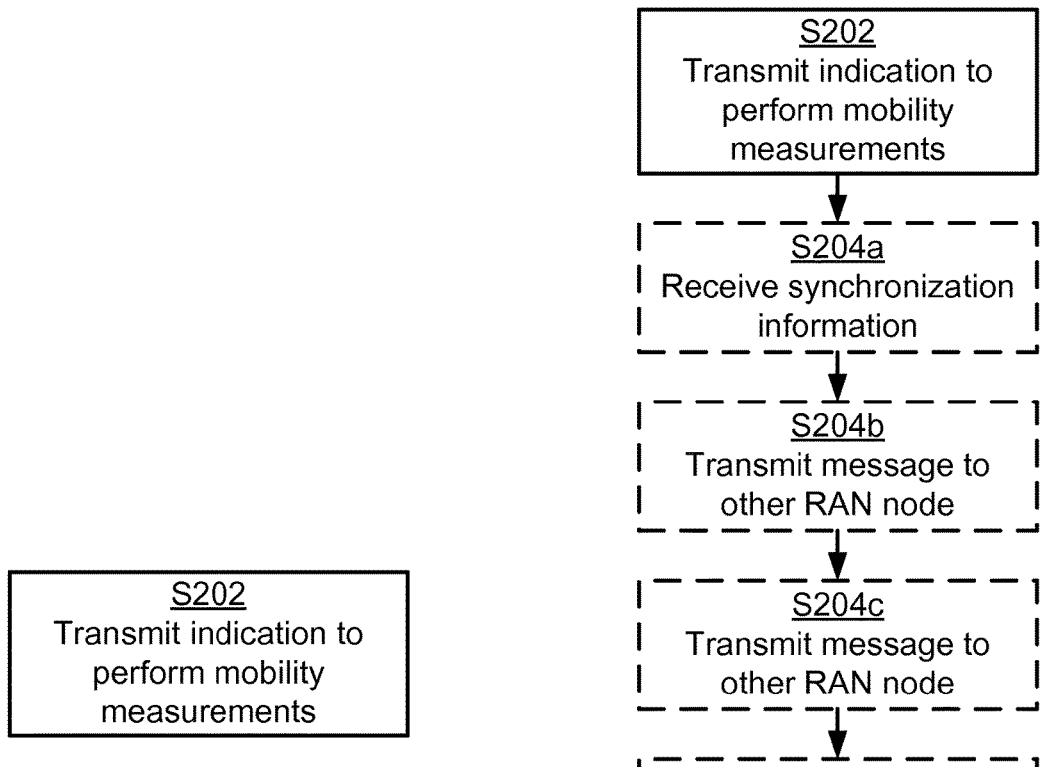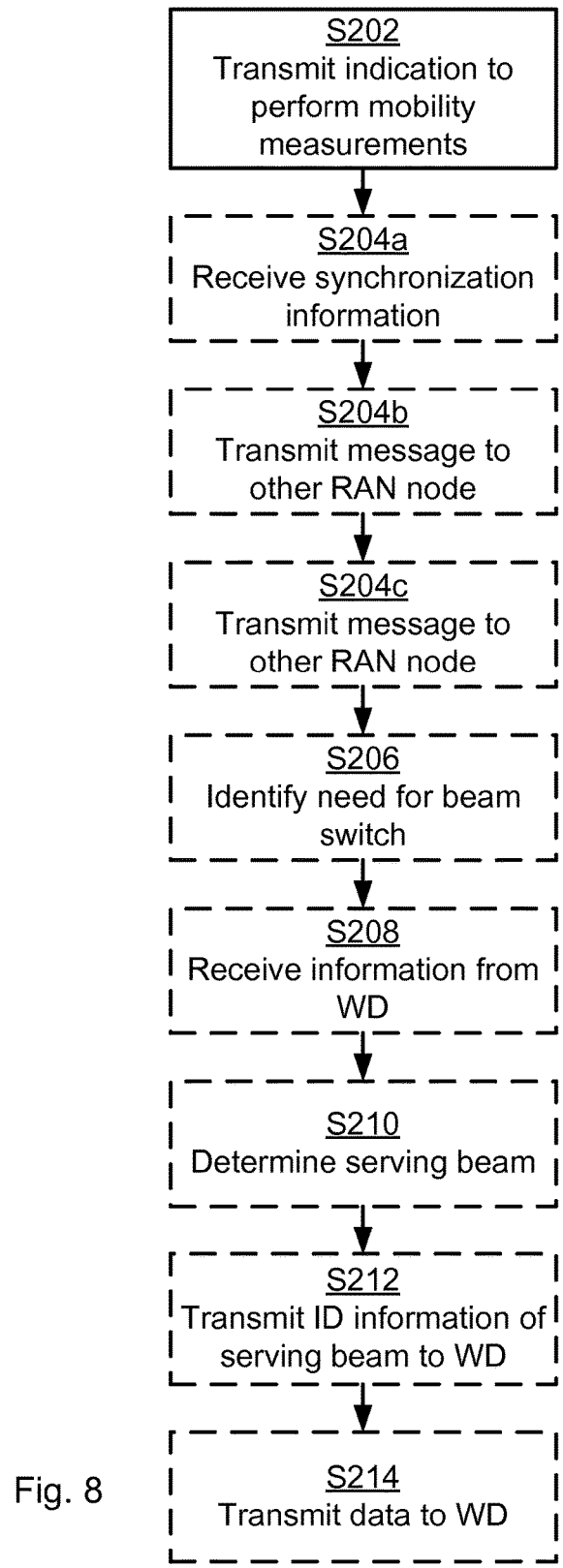

MOBILITY SYNCHRONIZATION MEASUREMENTS

TECHNICAL FIELD

Embodiments presented herein relate to handling mobility synchronization measurements, and particularly to methods, a wireless device, a radio access network node, computer programs, and a computer program product for handling mobility synchronization measurements.

BACKGROUND

In communications networks, there may be a challenge to obtain good performance and capacity for a given communications protocol, its parameters and the physical environment in which the communications network is deployed.

For example, handover is a vital part of any cellular communications network. A handover may be defined as the process of transferring an ongoing connection of a wireless device from one radio access network node (denoted the serving radio access network node) to another radio access network node (denoted the target radio access network node) in order to accomplish a transparent service over a large coverage area. The handover should be performed without any loss of data transmission to/from the wireless device, and with as small interrupt as possible for the wireless device.

To enable a handover, it is necessary to find a suitable target cell as served by the target radio access network node, and to ensure that it is possible to sustain reliable communication to/from the wireless device in the target cell. Candidates for suitable target radio access network nodes (and/or target cells) are usually stored in so-called neighbor lists, which are stored at least at the serving radio access network node.

For a wireless device (WD) to receive or measure on a target cell (i.e., an area served by a target radio access network (RAN) node), it needs be synchronized with the cell (i.e., with the target node). In legacy systems, all RAN nodes continuously transmit synchronization signals that WDs in neighbor cells use for synchronization with target cell. Examples include, but are not limited to, the synchronization channel (SCH) in Wideband Code Division Multiple Access (WCDMA) based communications networks and the primary and secondary synchronization signals in Long Term Evolution (LTE) based communications networks. The synchronization is usually achieved by correlating the received signal with a known signal; in LTE the correlation may be performed in both time and frequency domain. The synchronization procedure is often dived into several steps where the frequency and time resolution and is improved for each step. For time synchronization, the steps may include finding symbol, slot and frame timing.

Future cellular communications networks may use advanced antenna systems to a large extent. With such antennas, signals will be transmitted in narrow transmission beams to increase signal strength in some directions, and/or to reduce interference in other directions. When the antenna is used to increase coverage, handover between narrow transmission beams in neighboring RAN nodes may become a necessity. The serving RAN node also needs to decide if a beam switch or beam update is necessary within the own cell. The transmission beam through which the RAN node is currently communicating with the WD is called the serving beam and the transmission beam it will hand over to, or switch to, is called the target beam. The serving beam and the target beam may be transmission beams of the same or different RAN node.

In a cellular system with an advanced antenna system that uses narrow beams, beam updates for a WD might recur quite often. To synchronize and measure on the different candidate beams, the WD must thus potentially perform extensive timing synchronization procedures, especially in non-synchronized networks. For the WD, the synchronization procedure may be quite complex, since it may need to measure on many transmission beams at once.

Hence, there is still a need for improved handling of mobility synchronization measurements.

SUMMARY

An object of embodiments herein is to provide efficient handling of mobility synchronization measurements.

According to a first aspect there is presented a method for handling mobility synchronization measurements. The method is performed by a wireless device. The method comprises receiving an indication to perform mobility measurements on a set of transmission beams associated with a unique identity. The method comprises checking if the unique identity has previously been stored by the wireless device. The method comprises, if the unique identity has previously been stored by the wireless device, performing mobility measurements on the set of transmission beams based on previously stored synchronization information of the set of transmission beams, wherein the synchronization information is identified by the unique identity.

Advantageously this provides efficient handling of mobility synchronization measurements.

Advantageously this enables the time it takes for the WD to acquire synchronization to a target beam to be reduced compared to traditional approaches.

Advantageously, this enables the complete synchronization process to be performed less frequently compared to traditional approaches. Running the complete synchronization process less frequently will save WD complexity.

According to a variation of the first aspect there is presented a method for handling mobility synchronization measurements. The method is performed by a wireless device. The method comprises receiving an indication to perform mobility measurements on a set of transmission beams associated with a unique identity. The method comprises checking if the unique identity has previously been stored by the wireless device. The method comprises, if the unique identity has not previously been stored by the wireless device, performing mobility measurements on the set of transmission beams to determine synchronization information of the set of transmission beams. The method comprises storing the unique identity and the synchronization information of the mobility measurements.

According to a second aspect there is presented a wireless device for handling mobility synchronization measurements. The wireless device comprises a processing unit. The processing unit is configured to receive an indication to perform mobility measurements on a set of transmission beams associated with a unique identity. The processing unit is configured to check if the unique identity has previously been stored by the wireless device. The processing unit is configured to, if the unique identity has previously been stored by the wireless device, perform mobility measurements on the set of transmission beams based on previously stored synchronization information of the set of transmission beams, wherein the synchronization information is identified by the unique identity.

According to a variation of the second aspect there is presented a wireless device for handling mobility synchronization measurements. The wireless device comprises a processing unit. The processing unit is configured to receive an indication to perform mobility measurements on a set of transmission beams associated with a unique identity. The processing unit is configured to check if the unique identity has previously been stored by the wireless device. The processing unit is configured to, if the unique identity has not previously been stored by the wireless device, perform mobility measurements on the set of transmission beams to determine synchronization information of the set of transmission beams. The processing unit is configured to store the unique identity and the synchronization information of the mobility measurements According to a third aspect there is presented a computer program for handling mobility synchronization measurements, the computer program comprising computer program code which, when run on a processing unit of a wireless device, causes the processing unit to perform a method according to at least one of the first aspect and the variation of the first aspect.

According to a fourth aspect there is presented a method for handling mobility synchronization measurements. The method is performed by a radio access network node. The method comprises transmitting an indication for a wireless device to perform mobility measurements on a set of transmission beams associated with a unique identity.

According to a fifth aspect there is presented a radio access network node for handling mobility synchronization measurements. The radio access network node comprises a processing unit. The processing unit is configured to transmit an indication for a wireless device to perform mobility measurements on a set of transmission beams associated with a unique identity.

According to a sixth aspect there is presented a computer program for handling mobility synchronization measurements, the computer program comprising computer program code which, when run on a processing unit of a radio access network node, causes the processing unit to perform a method according to the fourth aspect.

According to a seventh aspect there is presented a computer program product comprising a computer program according to at least one of the third aspect and the sixth aspect and a computer readable means on which the computer program is stored.

It is to be noted that any feature of the first, second, third, fourth, fifth, sixth and seventh aspects may be applied to any other aspect, wherever appropriate. Likewise, any advantage of the first aspect may equally apply to the second, third, fourth, fifth, sixth and/or seventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 1 is a schematic diagram illustrating a communications network according to embodiments;

FIG. 2a is a schematic diagram showing functional units of a radio access network node according to an embodiment;

FIG. 2b is a schematic diagram showing functional modules of a radio access network node according to an embodiment;

FIG. 4 shows one example of a computer program product comprising computer readable means according to an embodiment;

FIGS. 5, 6, 7, and 8 are flowcharts of methods according to embodiments.

DETAILED DESCRIPTION

Figure 3A:
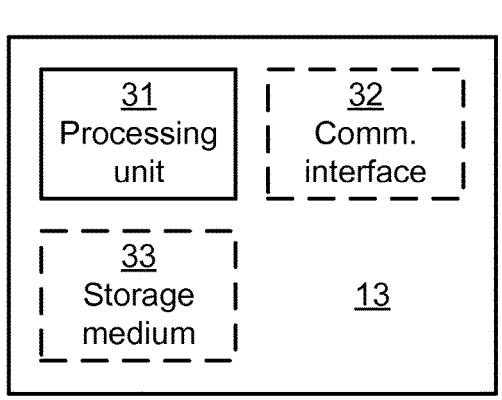
FIG. 3a is a schematic diagram showing functional units of a wireless device according to an embodiment.

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

FIG. 1 is a schematic diagram illustrating a communications network 10 where embodiments presented herein can be applied. The communications network 10 comprises radio access network (RAN) nodes 11a, 11b. Each RAN node may have a transmission point, one of which is schematically illustrated at reference numeral 11c. The RAN nodes may be any combination of radio base stations such as base transceiver stations, node Bs, and/or evolved node Bs. The RAN nodes may further be any combination of macro RAN nodes and micro, or pico, RAN nodes. Each RAN node 11a, 11b provides network coverage in a respective coverage region 12a, 12b by transmitting transmission beams 15a, 15b, 15c, 15d, 15f in that coverage region 12a, 12b. Each RAN node 11a, 11b is assumed to be operatively connected to a core network (not illustrated). The core network may in turn be operatively connected to a service and data providing wide area network.

Hence, a wireless device (WD) 13 served by one of the RAN nodes 11a, 11b may thereby access services and data as provided by the wide area network. The wireless devices 13 may be any combination of mobile stations, mobile phones, handsets, wireless local loop phones, user equipment (UE), smartphones, laptop computers, and/or tablet computers. Each wireless device 13 is located at current position [x1, y1] according to some coordinate system [x, y]. Further, although only two coordinates x and y are schematically illustrated in FIG. 1, the current position may have three coordinates [x1, y1, z1] for wireless device 13 in a three-dimensional coordinate system [x, y, z].

A wireless device 13 may move from position to position and thus from coverage region to 12a, 12b thus requiring handover of the wireless device 13 from one RAN node to another RAN node, or at least from one transmission beam to another transmission beam. As noted above, such handover should be performed without any loss of data transmission to/from the wireless device 13 and with as small interrupt as possible for the wireless device 13. The serving beam and the target beam may be transmission beams of the same or different RAN node. Hence, the term handover as herein used should be interpreted as a handover from a source beam to a target beam.

For illustrative, non-limiting, purposes it is in FIG. 1 assumed that the WD 13 is currently positioned at the border of two regions 12a, 12b. For illustrative, non-limiting, purposes it is in FIG. 1 further assumed that RAN node 11a is the serving RAN node and the RAN node 11b is the target RAN node. Each RAN node 11a, 11b is equipped with antennas configured to generate narrow transmission beams 15a, 15b, 15c, 15d, 15f. For illustrative, non-limiting, purposes it is in FIG. 1 assumed that transmission beam 15a is the serving beam for WD 13 and the other transmission beams 15b-15f are candidate target beams.

As noted above, in a cellular system, such as in the communications network 10, with RAN nodes 11a, 11b having advanced antenna systems that uses narrow transmission beams 15a-f, beam updates for a WD 13 might recur quite often. To synchronize and measure on the different candidate beams, the WD must thus, according to prior art, potentially perform extensive timing synchronization procedures, especially in non-synchronized networks. For the WD 13, the synchronization procedure according to prior art may thus be quite complex, since it may need to measure on many transmission beams 15a-f at once. There is thus a need for a candidate beam measurement approach where mobility measurement computational load at the WD 13 is minimized, or at least reduced.

The embodiments disclosed herein relate to handling of mobility synchronization measurements. In order to obtain such handling of mobility synchronization measurements there is provided a wireless device 13, a method performed by the wireless device 13, a computer program comprising code, for example in the form of a computer program product, that when run on a processing unit of the wireless device 13, causes the processing unit to perform the method of the wireless device 13. In order to obtain such handling of mobility synchronization measurements there is further provided a RAN node 11a, 11b, a method performed by the RAN node 11a, 11b, a computer program comprising code, for example in the form of a computer program product, that when run on a processing unit of the RAN node 11a, 11b, causes the processing unit to perform the method.

FIG. 2a schematically illustrates, in terms of a number of functional units, the components of a RAN node 11a, 11b according to an embodiment. A processing unit 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 41a (as in FIG. 4), e.g. in the form of a storage medium 23. Thus the processing unit 21 is thereby arranged to execute methods as herein disclosed. The storage medium 23 may also comprise persistent storage, which, for example, can be any single one or combination of magnetic memory, optical memory, solid state memory or even remotely mounted memory. The RAN node 11a, 11b may further comprise a communications interface 22 for communications with other radio access network nodes 11a, 11b and wireless devices 13. As such the communications interface 22 may comprise one or more transmitters and receivers, comprising analogue and digital components and a suitable number of antennas for radio communications and ports for wired communications. The processing unit 21 controls the general operation of the RAN node 11a, 11b e.g. by sending data and control signals to the communications interface 22 and the storage medium 23, by receiving data and reports from the communications interface 22, and by retrieving data and instructions from the storage medium 23. Other components, as well as the related functionality, of the RAN node 11a, 11b are omitted in order not to obscure the concepts presented herein.

FIG. 2b schematically illustrates, in terms of a number of functional modules, the components of a RAN node 11a, 11b according to an embodiment. The RAN node 11a, 11b of FIG. 2b comprises a number of functional modules such as a send and/or receive module 21a configured to perform below step S202, S204a, S204b, S204c, S208, S212, S214. The RAN node 11a, 11b of FIG. 2b may further comprises a number of optional functional modules, such as any of an identify module 21b configured to perform below step S206, and a determine module 21c configured to perform below step S210. The functionality of each functional module 21a-c will be further disclosed below in the context of which the functional modules 21a-c may be used. In general terms, each functional module 21a-c may be implemented in hardware or in software. Preferably, one or more or all functional modules 21a-c may be implemented by the processing unit 21, possibly in cooperation with functional units 22 and/or 23. The processing unit 21 may thus be arranged to from the storage medium 23 fetch instructions as provided by a functional module 21a-c and to execute these instructions, thereby performing any steps as will be disclosed hereinafter.

FIG. 3a schematically illustrates, in terms of a number of functional units, the components of a wireless device 13 according to an embodiment. A processing unit 31 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 41b (as in FIG. 4), e.g. in the form of a storage medium 33. Thus the processing unit 31 is thereby arranged to execute methods as herein disclosed. The storage medium 33 may also comprise persistent storage, which, for example, can be any single one or combination of magnetic memory, optical memory, solid state memory or even remotely mounted memory. The wireless device 13 may further comprise a communications interface 32 for communications with at least one RAN node 11a, 11b. As such the communications interface 32 may comprise one or more transmitters and receivers, comprising analogue and digital components and a suitable number of antennas for radio communications. The processing unit 31 controls the general operation of the wireless device 13 e.g. by sending data and control signals to the communications interface 32 and the storage medium 33, by receiving data and reports from the communications interface 32, and by retrieving data and instructions from the storage medium 33. Other components, as well as the related functionality, of the wireless device 13 are omitted in order not to obscure the concepts presented herein.

Figure 3B:
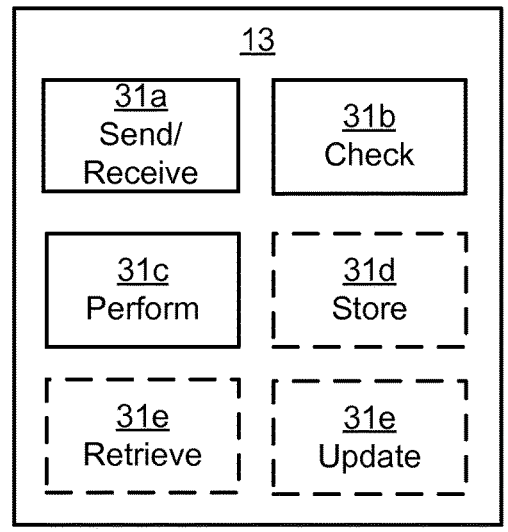
FIG. 3b is a schematic diagram showing functional modules of a wireless device according to an embodiment.

FIG. 3b schematically illustrates, in terms of a number of functional modules, the components of a wireless device 13 according to an embodiment. The wireless device 13 of FIG.

3b comprises a number of functional modules; a send and/or receive module 31a configured to perform below steps S102, S110a, S112, S114, S120, a check module 31b configured to perform below steps S104, S116, and a perform module 31c configured to perform below steps S106a, S106b, S106c. The wireless device 13 of FIG. 3b may further comprises a number of optional functional modules, such as any of a store module 31d configured to perform below step S108, a retrieve module 31e configured to perform below step S118, and an update module 31e configured to perform below step Snob. The functionality of each functional module 31a-e will be further disclosed below in the context of which the functional modules 31a-e may be used. In general terms, each functional module 31a-e may be implemented in hardware or in software. Preferably, one or more or all functional modules 31a-e may be implemented by the processing unit 21, possibly in cooperation with functional units 22 and/or 23. The processing unit 21 may thus be arranged to from the storage medium 23 fetch instructions as provided by a functional module 31a-e and to execute these instructions, thereby performing any steps as will be disclosed hereinafter.

FIG. 4 shows one example of a computer program product 41a, 41b comprising computer readable means 43. On this computer readable means 43, a computer program 42a can be stored, which computer program 42a can cause the processing unit 21 and thereto operatively coupled entities and devices, such as the communications interface 22 and the storage medium 23, to execute methods according to embodiments described herein. On this computer readable means 43, a computer program 42b can be stored, which computer program 42b can cause the processing unit 31 and thereto operatively coupled entities and devices, such as the communications interface 32 and the storage medium 33, to execute methods according to embodiments described herein. The computer programs 42a, 42b and/or computer program product 41a, 41b may thus provide means for performing any steps as herein disclosed.

In the example of FIG. 4, the computer program product 41a, 41b is illustrated as an optical disc, such as a CD (compact disc) or a DVD (digital versatile disc) or a Blu-Ray disc. The computer program product 41a, 41b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 41a, 41b is here schematically shown as a track on the depicted optical disk, the computer program 42a, 42b can be stored in any way which is suitable for the computer program product 41a, 41b.

Figure 5:
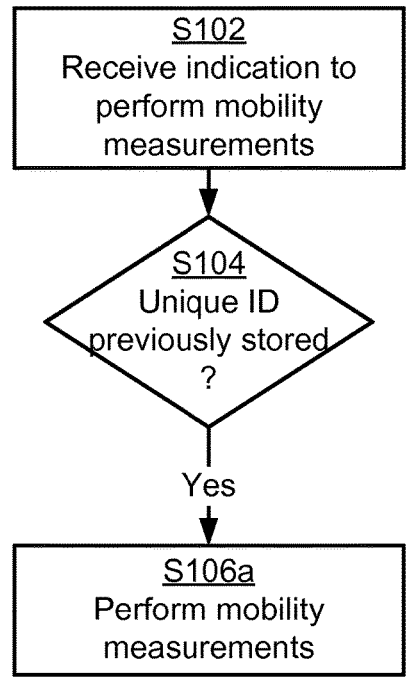
Figure 6:
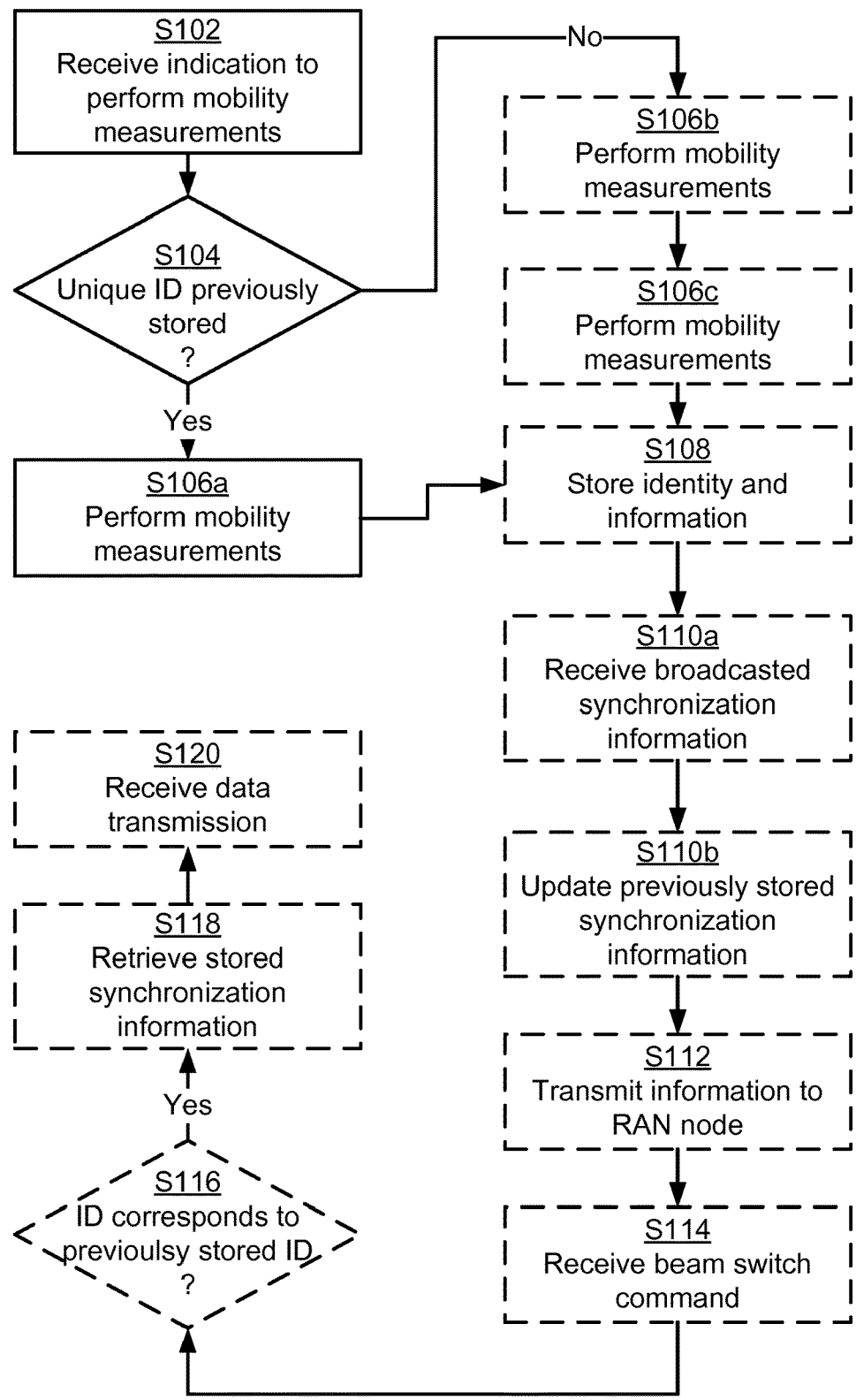

FIGS. 5 and 6 are flow chart illustrating embodiments of methods for handling mobility synchronization measurements as performed by the wireless device 13. The methods are advantageously provided as computer programs 42b. FIGS. 7 and 8 are flow chart illustrating embodiments of methods for handling mobility synchronization measurements as performed by the RAN node 11a. The methods are advantageously provided as computer programs 42a.

Reference is now made to FIG. 5 illustrating a method for handling mobility synchronization measurements as performed by the wireless device 13 according to an embodiment.

The wireless device 13 is configured to, in a step S102, receive an indication to perform mobility measurements on a set of transmission beams 15a, 15b, 15c, 15d, 15e, 15f. The set of transmission beams 15a, 15b, 15c, 15d, 15e, 15f is associated with a unique identity. Examples of the unique identity will be provided below.

Once having received this indication the wireless device 13 does not immediately perform mobility measurements on the set of transmission beams 15a, 15b, 15c, 15d, 15e, 15f. Instead, the wireless device 13 is configured to, in a step S104, check if the unique identity has previously been stored by the wireless device 13.

If the unique identity has previously been stored by the wireless device 13 this may indicate that previous information may be used to assist when performing the mobility measurements on the set of transmission beams 15a, 15b, 15c, 15d, 15e, 15f. Particularly. the wireless device 13 is configured to, in a step S106a, if the unique identity has previously been stored by the wireless device 13, perform mobility measurements on the set of transmission beams 15a, 15b, 15c, 15d, 15e, 15f. The mobility measurements are based on previously stored synchronization information of the set of transmission beams 15a, 15b, 15c, 15d, 15e, 15f. The synchronization information is identified by the unique identity.

Embodiments relating to further details of handling mobility synchronization measurements as performed by the wireless device 13 will now be disclosed.

The unique identity may also identify the transmitting RAN node 11a, 11b and/or transmission point 11c. In this way future measurement on candidate beams from the same RAN node can take advantage of the same stored synchronization information. Hence, the unique identity may identify the RAN node 11a and/or the transmission point 11c from which the set of transmission beams 15a, 15b, 15c, 15d, 15e, 15f was transmitted.

There may be different ways to provide the unique identity. For example, the unique identity may be represented by a sequence of binary digits. Identities of single transmission beams 15a, 15b, 15c, 15d, 15e, 15f in the set of transmission beams may share at least a subset of the sequence of binary digits. Hence, the wireless device 13 does not need to perform mobility measurements on such transmission beams that do not share at least subset of the sequence of binary digits. That is, since the wireless device 13 thereby only performs mobility measurements on transmission beams that share the unique identity, the wireless device 13 does not need to perform unnecessary mobility measurements on other transmission beams. The subset of the sequence of binary digits may correspond to an identity of a RAN node 11a, 11b. However, the subset of the sequence of binary digits may alternatively correspond to an identity of a group of RAN nodes, or a subset of transmission beams of one RAN node.

There may be different ways for the wireless device 13 to receive the synchronization information. For example, the synchronization information may be determined from synchronization signals transmitted in the set of transmission beams 15a, 15b, 15c, 15d, 15e, 15f.

There may be different types of synchronization information. In general terms, the synchronization information may be any combination of time synchronization information and frequency synchronization information. For example, the synchronization information may comprise a time offset to start of a first symbol of a first frame relative an internal clock of the wireless device 13. For example, the synchronization information may comprise a frequency offset to relative a reference frequency used by the wireless device 13. Both the WD clock and frequency reference may be assumed to be locked to the current serving beam. Alternatively, timing and frequency of the serving RAN node 11a become the internal references.

The wireless device 13 may then use the synchronization information to improve the measurements the next time it is requested to measure synchronization information, such as time synchronization signals (TSS) and/or mobility reference signals (MRS), sent on the same transmission beam.

The mobility measurements may further be based on reference signals transmitted in the set of transmission beams 15a, 15b, 15c, 15d, 15e, 15f.

Reference is now made to FIG. 6 illustrating methods for handling mobility synchronization measurements as performed by the wireless device 13 according to further embodiments.

There may be different ways for the wireless device 13 to act if the unique identity has not previously been stored by the wireless device 13. For example, the wireless device 13 may perform new mobility measurements, and then store the unique identity and synchronization information.

Particularly, the wireless device 13 may be configured to, in an optional step S106b, if the unique identity has not previously been stored by the wireless device 13, perform mobility measurements on the set of transmission beams 15a, 15b, 15c, 15d, 15e, 15f to determine synchronization information of the set of transmission beams 15a, 15b, 15c, 15d, 15e, 15f. The wireless device 13 may then be configured to, in an optional step S108, store the unique identity and the synchronization information of the mobility measurements.

For example, after the wireless device 13 has performed successful measurements on a transmission beam's TSS and/or MRS, the wireless device 13 may store the synchronization parameters in a lookup table. In general terms, by a successful measurement is meant that one or more correlation metrics used for synchronization are above some respective threshold values.

As noted above, the unique identity may also identify the transmitting RAN node 11a, 11b and/or transmission point 11c defining a cell ID. Hence, in one embodiment, such a table may be indexed using beam ID and cell ID, see Table 1.

TABLE 1

Example of a synchronization table used for a WD to look up time and frequency synchronization parameters for a cell and beam.

| Cell ID/Beam ID | Time synch. parameters | Frequency synch. parameters |
|---|---|---|
| A, 1 | $t_1$ | $f_1$ |
| A, 2 | $t_2$ | $f_2$ |
| B, 1 | $t_3$ | $f_3$ |
| . | . | . |
| . | . | . |
| . | . | . |

Hence, at least some of the herein disclosed embodiments are based on using an association of each transmission beam with a unique beam ID index. The communications network 10 may, via a RAN node 11a, inform the WD 13 about the beam ID when requesting mobility measurements on the transmission beam. When the WD 13 has identified the transmission beam and performed synchronization, the WD 13 may store the synchronization information (inter alia comprising settings) for the transmission beam using the beam ID. The stored settings may then be used by the WD 13 the next time the WD 13 is requested to perform mobility measurements on the transmission beam.

In practice Table 1 may be stored as a lookup table. Such a lookup table will have limited size and only the transmission beams for the N latest measured cells (RAN nodes) will be stored. It may be useful to have a separate table that only stores the time synchronization parameter for the cells (RAN nodes), see Table 2. Out of all synchronization parameters, the timing synchronization offset is the one that has the potential to reduce the WD processing load the most. The number of transmission beams per cell (RAN node) may be in the order 10-100. Table 2 will be able to store time parameters for a larger number of cells (RAN nodes) for the same memory size as for storing Table 1. The time synchronization parameter for a cell (RAN node) could be the average value for all the measured transmission beams for the cell (RAN node). The time synchronization parameter may be used for the initial time synchronization for a transmission beam from a cell (RAN node) that is only included in Table 2.

TABLE 2

An example of a synchronization table used for a WD to look up the time synchronization parameters for a cell.

| Cell ID | Time synchronization parameters |
|---|---|
| A | $t_1$ |
| B | $t_2$ |
| C | $t_3$ |
| . | . |
| . | . |
| . | . |

Further, if a transmission beam is sent from a RAN node that is included in the table, even if the specific transmission beam has not been encountered previously, the synchronization parameters for the other transmission beams from that same RAN node could be used as initial parameters. Stored synchronization information of other transmission beams may thus be used as initial parameters. Particularly, the wireless device 13 may be configured to, in an optional step S106c, if the unique identity has not previously been stored by the wireless device 13, perform mobility measurements on the set of transmission beams 15a, 15b, 15c, 15d, 15e, 15f to determine synchronization information of the set of transmission beams 15a, 15b, 15c, 15d, 15e, 15f. The mobility measurements are based on previously stored synchronization information of another set of transmission beams. The previously stored synchronization information is identified by a unique identity of this another set of transmission beams. Further, the previously stored synchronization information of this another set of transmission beams may be used to define initial parameters to be used during the mobility measurements on the set of transmission beams 15a, 15b, 15c, 15d, 15e, 15f.

There may be different ways to update previously stored synchronization information. For example, previously stored synchronization information may be updated when the wireless device 13 is in idle mode. Particularly, the wireless device 13 may be configured to, in an optional step S110a, receive, while in idle mode, broadcasted information, such as, but not limited to, synchronization information. The wireless device 13 may then be configured to, in an optional step S110b update previously stored synchronization information based on the broadcasted information. Table 2 may thus also be updated in idle mode, using synchronization and reference signals that are broadcasted in a cell. These synchronization and reference signals are generally sent too infrequently to be useful in active mode. A WD 13 is in active mode when it receives or transmits data.

There may be different ways for the wireless device 13 to handle the mobility measurements. For example, the wireless device 13 may inform the RAN node 11*a*, 11*b* of the mobility measurements. Particularly, the wireless device 13 may be configured to, in an optional step S112, transmit information of the mobility measurements to a RAN node. This RAN node may be the serving RAN node 11*a* of the wireless device 13 or a target RAN node, such as the RAN node 11*b*, of the wireless device 13. The wireless device 13 may thus inform the RAN node about gathered information about per-beam or pre-node synchronization parameters. The RAN node may then omit sending e.g. the TSS component in subsequent measurement session using previously activated transmission beams, RAN nodes, or transmission points.

The mobility measurements may be used to determine whether the wireless device 13 should be handed over from a serving RAN node, such as the RAN node 11*a*, to a target RAN node, such as the RAN node 11*b*. However, as noted above, handover should in this context have a broad interpretation and may comprise handover from a serving beam to a target beam, where the serving beam and the target beam are transmitted from the same RAN node 11*a*, 11*b*. Particularly, the wireless device 13 may be configured to, in an optional step S114, receive a beam switch command from a RAN node 11*a* serving the wireless device 13. The beam switch command comprises a target beam identity. The wireless device 13 may then be configured to, in an optional step S116, check if the target beam identity corresponds to any unique identity that has previously been stored by the wireless device 13. The wireless device 13 may then be configured to, in an optional step S118, retrieve stored synchronization information corresponding to the unique identity if the target beam identity corresponds to any unique identity that has previously been stored by the wireless device 13. The wireless device 13 may then be configured to, in an optional step S120, receive data transmission using the retrieved synchronization information.

Reference is now made to FIG. 7 illustrating a method for handling mobility synchronization measurements as performed by the RAN node 11*a* according to an embodiment.

As disclosed above the wireless device 13 in step S102 receives an indication to perform mobility measurements. Hence the RAN node 11*a* is configured to, in a step S202, transmit an indication for the wireless device 13 to perform mobility measurements on the set of transmission beams 15*a*, 15*b*, 15*c*, 15*d*, 15*e*, 15*f* associated with the unique identity.

Embodiments relating to further details of handling mobility synchronization measurements as performed by the RAN node 11*a* will now be disclosed.

Reference is now made to FIG. 8 illustrating methods for handling mobility synchronization measurements as performed by the RAN node 11*a* according to further embodiments.

There may be different ways for the RAN node 11*a* to act once it has transmitted the indication in step S202. Different embodiments relating thereto will now be described in turn.

For example, the RAN node 11*a* may be configured to, in an optional step S204*a*, transmit synchronization information using the set of transmission beams associated with the unique identity. This synchronization information may be received by the wireless device 13 as in step S110*a*.

For example, the RAN node 11*a* may be configured to, in an optional step S204*b*, transmit a message to another RAN node 11*b* to activate transmission of synchronization information using the set of transmission beams 15*a*, 15*b*, 15*c*, 15*d*, 15*e*, 15*f* associated with the unique identity. This may be the case if the RAN node 11*a* has identified a need for a beam switch, see step S206 below.

For example, the RAN node 11*a* may be configured to, in an optional step S204*c*, transmit a message to another RAN node 11*b*. The message may comprise position information [x1, y1] of the wireless device 13. This may enable this another RAN node 11*b* to choose which transmission beams to active for transmission towards the wireless device 13.

Further, the RAN node 11*a* may be configured to, in an optional step S206, identify that a beam switch is needed for the wireless device 13. The set of transmission beams may then be based thereon. Hence, which beams to be included in the set of transmission beams may be based on whether a beam switch is needed for the wireless device 13 or not. The set of transmission beams may then represent candidate target beams for the wireless device 13.

There may be different ways for the RAN node 11*a* to determine which transmission beam is to be used as the new serving beam of the WD 13. Particularly, the RAN node 11*a* may be configured to, in an optional step S208, receive information of the mobility measurements from the wireless device. The mobility measurements may be performed as in any of steps S106*a*, S106*b*, S106*c* above. The RAN node 11*a* may then be configured to, in an optional step S210, determine a serving beam from the set of transmission beams for the wireless device 13 based on the received information.

Further, when the serving RAN node 11*a* decides on a beam switch, it may signal identity information, such as the cell ID and/or beam ID for the target beam to the WD 13. The WD 13 may then use stored synchronization parameters for the target beam when receiving data on the serving beam, as in step S120, hence no additional coarse synchronization procedures or synchronization signaling is needed for the beam switch. Particularly, the RAN node 11*a* may be configured to, in an optional step S212, transmit identity information of the serving beam to the wireless device 13; and in an optional step S214, transmit data to the wireless device 13 using the serving beam.

Referring back to FIG. 1, WD 13 in region 12*a* has an ongoing connection with RAN node 11*a* on transmission beam 15*a*. No pilots are transmitted continuously, indicated by the dashed lines for the remaining transmission beams 15*b*-*f*. RAN node 11*a* determines that beam switch is necessary, based on measurements of the current connection quality for the serving beam 15*a*. These measurements are e.g. measurements of received quality (CQI). Based on e.g. the WD position [x1, y1] or the current transmission beam 15*a*, RAN node 11*a* selects a set of candidate transmission beams. If some of the candidate transmission beams belong to RAN node 11*b*, RAN node 11*a* sends a message to RAN node 11*b* to activate downlink synchronization and reference signals for those transmission beams. Alternatively RAN node 11*a* could send the WD position [x1, y1] to RAN node 11*b* and RAN node 11*b* could decide autonomously which candidate transmission beams to activate. RAN node 11*a* also informs the WD 13 to start searching for the MRS/TSS signals according to a supplied list of beam IDs. RAN node 11*a* and/or RAN node 11*b* then transmits TSS/MRS in downlink on the candidate transmission beams. The WD 13 then synchronizes and measures on the transmission beams and reports the measurement results to RAN node 11a. RAN node 11a may then determine to perform a beam switch based on the measurement reports. The herein disclosed beam ID list mechanism (i.e., the utilization of previously stored unique identities) is used to avoid performing the synchronization every time a mobility measurement for a transmission beam is performed. For example, according to at least some of the herein disclosed embodiments the beam ID corresponding to each activated transmission beam is signaled using control signaling from the serving RAN node 11a to the WD 13. The beam ID may be unique to the given beam configuration (originating RAN node, beamforming/precoding parameters, etc.) within some geographical area and it may contain information at least about the TSS/MRS signals used for synchronization. For the WD 13 to also know which RAN node the transmission beam(s) belongs to, the cell ID could also be provided with the beam ID.

In summary, at least some of the herein disclosed embodiments describe a procedure to reduce WD complexity in a communications network 10 with beam forming of the downlink channel where there is no continuous transmission of mobility synchronization and pilot or reference signals. This is achieved by denoting the transmission beams with unique identities, such as beam IDs and cell IDs. Mobility synchronization measurements on the transmission beams may be stored in lookup table indexed with the beam ID and cell ID. For data transmission to the WD 13, the RAN node may inform the WD 13 of the beam ID and cell ID before transmitting on the transmission beam The WD 13 may then use stored synchronization parameters for reception on these transmission beams.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for handling mobility synchronization measurements, the method being performed by a wireless device, the method comprising the steps of:
receiving, from a radio access network node, an indication to perform mobility measurements on a set of narrow transmission beams, wherein the set of narrow transmission beams to be measured is indicated by a shared unique identity, and wherein each of the narrow transmission beams has increased signal strength in a beam direction;
prior to performing mobility measurements on the set of narrow transmission beams, checking whether said shared unique identity has previously been stored by the wireless device, and when said shared unique identity has previously been stored by the wireless device:
performing mobility measurements on the set of narrow transmission beams based on previously stored synchronization information of the set of narrow transmission beams, wherein said synchronization information is identified by said shared unique identity,
wherein the wireless device operates in a cellular communication network that comprises a plurality of radio access network nodes, wherein each of the radio access network nodes provides network coverage in a respective coverage region by transmitting narrow transmission beams in the respective coverage region.

2. The method according to claim 1, further comprising, when said shared unique identity has not previously been stored by the wireless device:
performing mobility measurements on the set of narrow transmission beams to determine synchronization information of the set of narrow transmission beams; and
storing said shared unique identity and said synchronization information of said mobility measurements.

3. The method according to claim 1, further comprising:
receiving a beam switch command from a radio access network node serving the wireless device, the beam switch command comprising a target beam identity;
checking whether said target beam identity corresponds to any shared unique identity having previously been stored by the wireless device, and when said target beam identity corresponds to any shared unique identity having previously been stored by the wireless device:
retrieving stored synchronization information corresponding to said shared unique identity; and
receiving data transmission using the retrieved synchronization information.

4. The method according to claim 1, wherein said shared unique identity identifies at least one of a radio access network node and a transmission point from which the set of narrow transmission beams was transmitted.

5. The method according to claim 1, wherein said shared unique identity is represented by a sequence of binary digits, and wherein identities of single narrow transmission beams in said set of narrow transmission beams share at least a subset of said sequence of binary digits.

6. The method according to claim 1, wherein said synchronization information is determined from synchronization signals transmitted in the set of narrow transmission beams.

7. The method according to claim 1, wherein said synchronization information comprises at least one of a time offset to start of a first symbol of a first frame relative an internal clock of the wireless device, and a frequency offset to relative a reference frequency used by the wireless device.

8. The method according to claim 1, further comprising, when said shared unique identity has not previously been stored by the wireless device:
performing mobility measurements on the set of narrow transmission beams to determine synchronization information of the set of narrow transmission beams, wherein said mobility measurements are based on previously stored synchronization information of another set of narrow transmission beams, and wherein said previously stored synchronization information is identified by a shared unique identity of said another set of narrow transmission beams.

9. The method according to claim 8, wherein said previously stored synchronization information of said another set of narrow transmission beams is used to define initial parameters to be used during said mobility measurements on the set of narrow transmission beams.

10. The method according to claim 1, wherein said mobility measurements further are based on reference signals transmitted in the set of narrow transmission beams.

11. The method according to claim 1, further comprising:
receiving, while in idle mode, broadcasted information; and
updating previously stored synchronization information based on said broadcasted information.

12. The method according to claim 1, further comprising:
transmitting information of said mobility measurements to a radio access network node.

13. A method for handling mobility synchronization measurements, the method being performed by a radio access network node, the method comprising the steps of:
transmitting an indication for a wireless device to perform mobility measurements on a set of narrow transmission beams, wherein the set of narrow transmission beams to be measured is indicated by a shared unique identity, and wherein each of the narrow transmission beams has increased signal strength in a beam direction;
receiving information of said mobility measurements from the wireless device; and
determining a serving beam from the set of narrow transmission beams for the wireless device based on the received information,
wherein the radio access node operates in a cellular communication network that comprises the radio access node and one or more other radio access network nodes, wherein each of the radio access network node and one or more other radio access network nodes provides network coverage in a respective coverage region by transmitting narrow transmission beams in the respective coverage region.

14. The method according to claim 13, further comprising:
transmitting synchronization information using the set of narrow transmission beams associated with said shared unique identity.

15. The method according to claim 13, further comprising:
transmitting a message to another radio access network node to activate transmission of synchronization information using the set of narrow transmission beams associated with said shared unique identity.

16. The method according to claim 13, further comprising:
transmitting a message to another radio access network node, the message comprising position information of the wireless device.

17. The method according to claim 13, further comprising:
identifying that a beam switch is needed for the wireless device, and wherein the set of narrow transmission beams is based thereon.

18. The method according to claim 17, wherein said set of narrow transmission beams represent candidate target beams for the wireless device.

19. The method according to claim 13, further comprising:
transmitting identity information of the serving beam to the wireless device; and
transmitting data to the wireless device using the serving beam.

20. A wireless device for handling mobility synchronization measurements, the wireless device comprising a processing unit, the processing unit being configured to:
receive, from a radio access network node, an indication to perform mobility measurements on a set of narrow transmission beams, wherein the set of narrow transmission beams to be measured is indicated by a shared unique identity, and wherein each of the narrow transmission beams has increased signal strength in a beam direction;
prior to performing mobility measurements on the set of narrow transmission beams, check whether said shared unique identity has previously been stored by the wireless device, and when said shared unique identity has previously been stored by the wireless device:
perform mobility measurements on the set of narrow transmission beams based on previously stored synchronization information of the set of narrow transmission beams, wherein said synchronization information is identified by said shared unique identity,
wherein the wireless device is configured to operate in a cellular communication network that comprises a plurality of radio access network nodes, wherein each of the radio access network nodes provides network coverage in a respective coverage region by transmitting narrow transmission beams in the respective coverage region.

21. A radio access network node for handling mobility synchronization measurements, the radio access network node comprising a processing unit, the processing unit being configured to:
transmit an indication for a wireless device to perform mobility measurements on a set of narrow transmission beams, wherein the set of narrow transmission beams to be measured is indicated by a shared unique identity, and wherein each of the narrow transmission beams has increased signal strength in a beam direction;
receive information of said mobility measurements from the wireless device; and
determine a serving beam from the set of narrow transmission beams for the wireless device based on the received information,
wherein the radio access node is configured to operate in a cellular communication network that comprises the radio access node and one or more other radio access network nodes, wherein each of the radio access network node and one or more other radio access network nodes is configured to provide network coverage in a respective coverage region by transmitting narrow transmission beams in the respective coverage region.

22. A nontransitory computer readable medium comprising a computer program for handling mobility synchronization measurements, the computer program comprising computer program code which, when run on a processing unit of a wireless device causes the processing unit to:
receive, from a radio access network node, an indication to perform mobility measurements on a set of narrow transmission beams, wherein the set of narrow transmission beams to be measured is indicated by a shared unique identity, and wherein each of the narrow transmission beams has increased signal strength in a beam direction;
prior to performing mobility measurements on the set of narrow transmission beams, check whether said shared unique identity has previously been stored by the wireless device, and when said shared unique identity has previously been stored by the wireless device:
perform mobility measurements on the set of narrow transmission beams based on previously stored synchronization information of the set of narrow transmission beams, wherein said synchronization information is identified by said shared unique identity,
wherein the wireless device is configured to operate in a cellular communication network that comprises a plurality of radio access network nodes, wherein each of the radio access network nodes provides network coverage in a respective coverage region by transmitting narrow transmission beams in the respective coverage region.

23. A nontransitory computer readable medium comprising a computer program for handling mobility synchronization measurements, the computer program comprising computer program code which, when run on a processing unit of a radio access network node causes the processing unit to:
- transmit an indication for a wireless device to perform mobility measurements on a set of narrow transmission beams, wherein the set of narrow transmission beams to be measured is indicated by a shared unique identity, and wherein each of the narrow transmission beams has increased signal strength in a beam direction;
- receive information of said mobility measurements from the wireless device; and
- determine a serving beam from the set of narrow transmission beams for the wireless device based on the received information,
- wherein the radio access node is configured to operate in a cellular communication network that comprises the radio access node and one or more other radio access network nodes, wherein each of the radio access network node and one or more other radio access network nodes is configured to provide network coverage in a respective coverage region by transmitting narrow transmission beams in the respective coverage region.

* * * * *

UNITED STATES PATENT AND TRADEMARK OFFICE
CERTIFICATE OF CORRECTION

PATENT NO. : 10,334,489 B2
APPLICATION NO. : 15/517446
DATED : June 25, 2019
INVENTOR(S) : Cedergren et al.

It is certified that error appears in the above-identified patent and that said Letters Patent is hereby corrected as shown below:

On the Title Page

Item (72), under "Inventors", in Column 1, Line 1, delete "Bjarred" and insert -- Bjärred --, therefor.

Item (72), under "Inventors", in Column 1, Line 2, delete "Malmo" and insert -- Malmö --, therefor.

Item (72), under "Inventors", in Column 1, Line 3, delete "Balsta" and insert -- Bålsta --, therefor.

In the Specification

In Column 1, Line 40, delete "needs be" and insert -- needs to be --, therefor.

Signed and Sealed this
Fifteenth Day of October, 2019

Andrei Iancu
*Director of the United States Patent and Trademark Office*